(12) United States Patent
Han et al.

(10) Patent No.: US 11,134,246 B2
(45) Date of Patent: Sep. 28, 2021

(54) WEIGHTED PREDICTION FOR VIDEO CODING

(71) Applicant: QUALCOMM Incorporated, San Diego, CA (US)

(72) Inventors: Yu Han, San Diego, CA (US); Wei-Jung Chien, San Diego, CA (US); Chun-Chi Chen, San Diego, CA (US); Vadim Seregin, San Diego, CA (US); Marta Karczewicz, San Diego, CA (US)

(73) Assignee: Shumaker & Sieffert, P.A., San Diego, CA (US)

(*) Notice: Subject to any disclaimer, the term of this patent is extended or adjusted under 35 U.S.C. 154(b) by 0 days.

(21) Appl. No.: 16/730,708

(22) Filed: Dec. 30, 2019

(65) Prior Publication Data

US 2020/0213586 A1    Jul. 2, 2020

Related U.S. Application Data

(60) Provisional application No. 62/787,701, filed on Jan. 2, 2019.

(51) Int. Cl.
*H04N 19/115* (2014.01)
*H04N 19/119* (2014.01)
*H04N 19/96* (2014.01)
*H04N 19/176* (2014.01)

(52) U.S. Cl.
CPC ......... *H04N 19/115* (2014.11); *H04N 19/119* (2014.11); *H04N 19/176* (2014.11); *H04N 19/96* (2014.11)

(58) Field of Classification Search
CPC ... H04N 19/176; H04N 19/119; H04N 19/115
See application file for complete search history.

(56) References Cited

U.S. PATENT DOCUMENTS

| 2006/0268166 | A1* | 11/2006 | Bossen | H04N 19/577 348/390.1 |
|---|---|---|---|---|
| 2011/0007803 | A1* | 1/2011 | Karczewicz | H04N 19/51 375/240.15 |
| 2014/0140409 | A1* | 5/2014 | Kim | H04N 19/139 375/240.16 |
| 2018/0288430 | A1* | 10/2018 | Chen | H04N 19/52 |
| 2019/0158835 | A1* | 5/2019 | Lee | H04N 19/50 |

OTHER PUBLICATIONS

"Bilateral Filter", Wikipedia, Feb. 10, 2020, pp. 1-5.

(Continued)

*Primary Examiner* — Zhubing Ren
(74) *Attorney, Agent, or Firm* — Shumaker & Sieffert, P.A.

(57) ABSTRACT

A device for processing video data includes a memory configured to store video data and one or more processors implemented in circuitry. The one or more processors are configured to generate a first weighting factor for a first reference picture in a first picture list using a second weighting factor for a second reference picture in a second picture list. The one or more processors are further configured to generate prediction information for a current block of video data using the first weighting factor and the second weighting factor.

21 Claims, 10 Drawing Sheets

(56) References Cited

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
Bross B., et al., "Versatile Video Coding (Draft 1)", JVET-J1001-v2, Joint Video Experts Team (JVET) of ITU-T SG 16 WP 3 and ISO/IEC JTC 1/SC 29/WG 11, 10th Meeting, Apr. 2018, JVET-J1001-d2, 43 pages.
Chen J., et al., "Algorithm description for Versatile Video Coding and Test Model 1 (VTM 1)", Joint Video Exploration Team (JVET) of ITU-T SG 16 WP 3 and ISO/IEC JTC 1/SC 29/WG 11, 10th Meeting: San Diego, US, Apr. 10-20, 2018, Jun. 16, 2018, JVET-J1002-v2, 10 pages, XP030198635, http://phenix.int-evry.fr/jvet/doc_end_user/documents/10_SanDiego/wg11/JVET-J1002-v2.zip.
Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16 ); URL: http://phenix.int-evry.fr/jvet/,, No. JVET-A1001 Feb. 24, 2016 (Feb. 24, 2016), XP030150000, 27 pages.
Chen J., et al., "Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2.
Ergen S., "ZigBee/IEEE 802.15.4 Summary", Sep. 10, 2004, 37 Pages.
He K., et al., "Guided Image Filtering," IEEE Transactions on Pattern Analysis and Machine Intelligence, vol. 35, No. 6, Jun. 2013, 13 Pages.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
ITU-T H.265, "Series H: Audiovisual and Multimedia Systems, Infrastructure of audiovisual services—Coding of moving video, High efficiency video coding," The International Telecommunication Union. Dec. 2016, 664 Pages.
Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, ISSN: 1051-8215, DOI: 10.1109/TCSVT.2012.2221191 the whole document.
"Sum of Absolute Transformed Differences", Wikipedia, Feb. 10, 2020, pp. 1-2.
Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.
Bross B., et al., "Versatile Video Coding (Draft 7)", Joint Video Experts Team (JVET) of ITU-T SG 16 WP 3 and ISO/IEC JTC 1/SC 29/WG 11, 16th Meeting, Oct. 1-11, 2019, JVET-P2001-v9, 490 pages.
Zhang (Bytedance) L., et al., "CE4-related: History-based Motion Vector Prediction", 11. JVET Meeting, Jul. 11, 2018-Jul. 18, 2018, Ljubljana, (The Joint Video Explorationteam of ISO/IEC JTC1/SC29/WG11 and ITU-TSG.16), No. JVET-K0104-v5, Jul. 18, 2018 (Jul. 18, 2018), XP030200019, 7 pages, Retrieved from the Internet:URL:http://phenix.int-evry.fr/jvet/doc_end_user/documents/11_Ljubljana/wg11/JVET-K0104-v5.zip JVET-K0104 r4.docx [retrieved on Jul. 18, 2018].
Chen J., et al., "Algorithm description for Versatile Video Coding and Test Model 3 (VTM 3)", Joint Video Experts Team (JVET) of ITU-T SG 16 WP 3 and ISO/IEC JTC 1/SC 29/WG 11, JVET-L1002-v1, 12th Meeting: Macao, CN, Oct. 3-12, 2018, 48 pages.

* cited by examiner

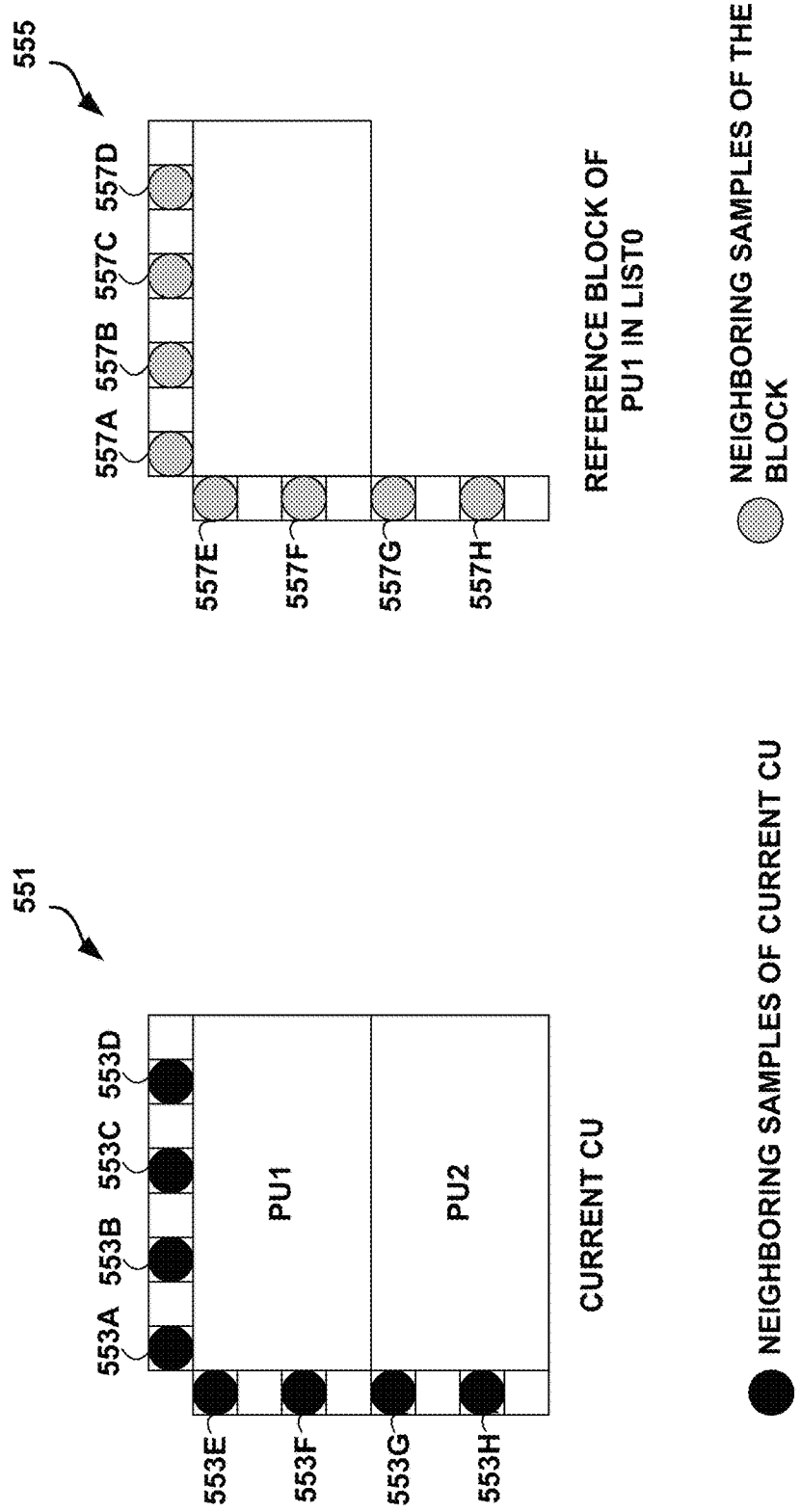

WEIGHTED PREDICTION FOR VIDEO CODING

This application claims the benefit of U.S. Provisional Patent Application 62/787,701, filed Jan. 2, 2019, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for deriving a weighting factor for weighted prediction. The example techniques may be applied to any of the existing and developing video codecs, such as HEVC (High Efficiency Video Coding), VVC (Versatile Video Coding) or be a coding tool corresponding to any other video coding standard. In weighted prediction for bi-directional prediction, a video coder (e.g., a video encoder or video decoder) may use a first weighting factor and a second weighting factor to generate prediction information for a current block. In one or more examples described herein, the video coder may be configured to generate (e.g., derive, calculate, etc.) a first weighting factor using the second weighting factor. In this way, the video encoder may refrain from signaling the first weighting factor in a bitstream, which may improve bandwidth efficiency because both weighting factors do not have to be signaled.

In one example, a method of processing video includes generating, by one or more processors implemented in circuitry, a first weighting factor for a first reference picture in a first picture list using a second weighting factor for a second reference picture in a second picture list; and generating, by the one or more processors, prediction information for a current block of the video data using the first weighting factor and the second weighting factor.

In another example, a device for processing video data includes a memory configured to store video data and one or more processors implemented in circuitry. The one or more processors are configured to generate a first weighting factor for a first reference picture in a first picture list using a second weighting factor for a second reference picture in a second picture list and generate prediction information for a current block of the video data using the first weighting factor and the second weighting factor.

In one example, a computer-readable storage medium has stored thereon instructions that, when executed, cause a processor to generate a first weighting factor for a first reference picture in a first picture list using a second weighting factor for a second reference picture in a second picture list and generate prediction information for a current block of the video data using the first weighting factor and the second weighting factor.

In another example, a device for coding video data includes means for generating a first weighting factor for a first reference picture in a first picture list using a second weighting factor for a second reference picture in a second picture list and means for generating prediction information for a current block of the video data using the first weighting factor and the second weighting factor.

The details of one or more examples are set forth in the accompanying drawings and the description below. Other features, objects, and advantages will be apparent from the description, drawings, and claims.

BRIEF DESCRIPTION OF DRAWINGS

FIG. 5A is a conceptual diagram illustrating example neighboring samples of a current coding unit (CU) used for deriving illumination compensation (IC) parameters.

FIG. 5B is a conceptual diagram illustrating example neighboring samples of a reference block used for deriving IC parameters.

DETAILED DESCRIPTION

Figure 1:
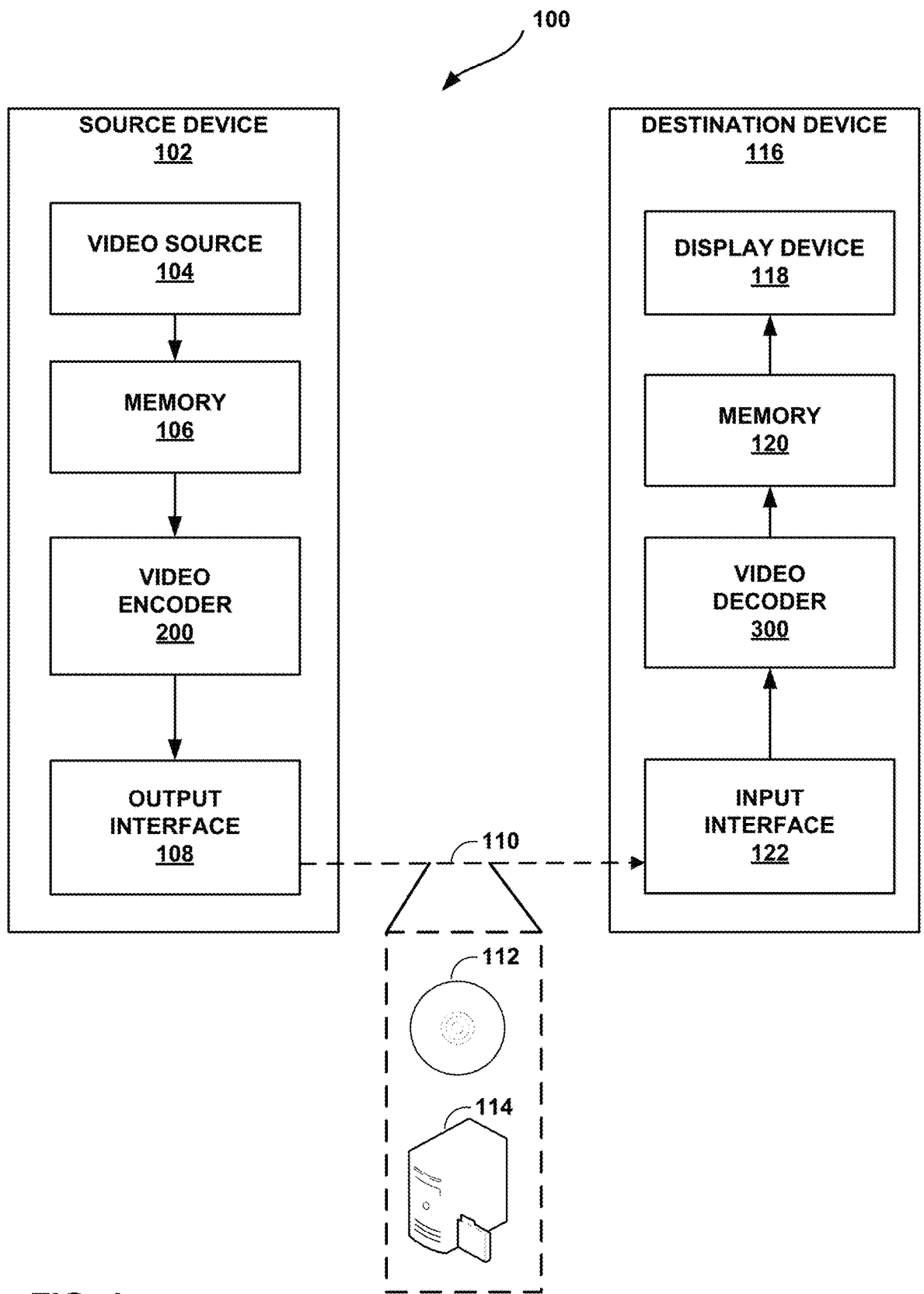
FIG. 1 is a block diagram illustrating an example video encoding and decoding system that may perform the techniques of this disclosure.

As described in more detail below, the disclosure describes example techniques for using weighted prediction. Such techniques for weighted prediction may be applied to bi-directional prediction and other prediction techniques. In an example of bi-directional prediction, a video coder (e.g., a video encoder or a video decoder) may use a first reference picture in a first picture list (e.g., list 0 or simply "L0") and a second reference picture in a second picture list (e.g., list 1 or simply "L1") to generate prediction information for a current block of video data. Rather than applying equal weightings to predictors from L0 (e.g., a first block from a first reference picture from L0) and predictors from L1 (e.g., a second block from a second reference picture from L1), the video coder may apply a first weighting factor to predictors from L0 and apply a second weighting factor to predictors from L1. Using the first weighting factor and the second weighting factor may improve an accuracy of a predicted block compared to systems that omit the first weighting factor and the second weighting factor (i.e., set the first weighting factor and the second weighting factor to one) and compared to systems that use only one weighting factor (e.g., the first weighting factor and the second weighting factor is the same).

In some systems, a video encoder may signal the first weighting factor and the second weighting factor in a bitstream that includes video data. For instance, the video encoder may generate a bitstream that explicitly signals the first weighting factor and the second weighting factor for a current block and a residual block for the current block. In this example, the video decoder may generate a predicted block using the first weighting factor and the second weighting factor for the current block. The video decoder may combine the predicted block with the residual block to generate the current block.

Rather than signaling both the first weighting factor and the second weighting factor for a current block, a video coder (e.g., video encoder or video decoder) may be configured to generate a first weighting factor for a first reference picture in a first picture list using a second weighting factor for a second reference picture in a second picture list. For example, the video encoder may signal the second weighting factor in a bitstream that includes video data and refrain from signaling the first weighting factor. In this example, the video decoder may generate the first weighting factor based on the second weighting factor. For instance, the video decoder (and the video encoder) may generate the first weighting factor by calculating one minus the second weighting factor, but other techniques (e.g., other than one minus second weighting factor) to generate the first weighting factor based on the second weighting factor are possible. In this way, the video coder may be configured to improve bandwidth efficiency of the video encoder and the video decoder compared to systems that explicitly signal both the first weighting factor and the second weighting factor.

Techniques described herein for weighted prediction may be applied to any of the existing video codecs, such as HEVC (High Efficiency Video Coding), VVC (Versatile Video Coding) or be an efficient coding tool in any future video coding standards. While examples of describes techniques related to weighted prediction are described with relation to HEVC and on-going works in Versatile Video Coding (VVC), techniques described herein may be applied to other existing video codecs and/or future video coding standards.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including a computer (e.g., a desktop computer, a notebook (e.g., laptop) computers, tablet computers, etc.), a set-top box, a mobile device, (e.g., smartphone), a television, a camera, a display device, a digital media player, a video gaming console, a video streaming device (e.g., a broadcast receiver device), or other devices. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for generating a first weighting factor for a first reference picture in a first picture list using a second weighting factor for a second reference picture in a second picture list. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

In accordance with the techniques of this disclosure, a video coder (video encoder 200 or video decoder 300) may be configured to generate a first weighting factor for a first reference picture in a first picture list using a second weighting factor for a second reference picture in a second picture list and generate prediction information for a current block of the video data using the first weighting factor and the second weighting factor.

System 100 as shown in FIG. 1 is merely one example. In general, any digital video encoding and/or decoding device may perform techniques for generating a first weighting factor for a first reference picture in a first picture list using a second weighting factor for a second reference picture in a second picture list. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and/or destination device 116 may operate in a substantially symmetrical manner such that each of source device 102 and/or destination device 116 include video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally, or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 7)," Joint Video Experts Team (JVET) of ITU-T SG 16 WP 3 and ISO/IEC JTC 1/SC 29/WG 11, 16$^{th}$ Meeting: Geneva, CH, 1-11 Oct. 2019, JVET-P2001-v9 (hereinafter "VVC Draft 7"). The techniques of this disclosure, however, are not limited to any particular coding standard.

Examples of video coding standards may include, but is not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a new video coding standard, namely High Efficiency Video Coding (HEVC) or ITU-T H.265, including its range extension, multiview extension (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

The latest HEVC draft specification, and referred to as HEVC WD hereinafter, is available from http://phenix.int-evry.fr/jct/doc_end_user/documents/14_Vienna/wg11/JCTVC-N1003-v1.zip.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. The latest version of reference software, i.e., Joint Exploration Model 7 (JEM 7) could be downloaded from: https://jvet.hhi.fraunhofer.de/svn/svn_HMJEMSoftware/tags/HM-16.6-JEM-7.0/. Algorithm description of Joint Exploration Test Model 7 (JEM7) could be referred to JVET-G1001.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM. According to JEM, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

VVC and JEM also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. VVC and JEM provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and/or video decoder 300 may be configured to generate a first weighting factor for a first reference picture in a first picture list using a second weighting factor for a second reference picture in a second picture list; and generate prediction information using the first weighting factor and the second weighting factor and to generate prediction information using the first weighting factor and the second weighting factor. Generating the first weighting factor may reduce an amount of data transmitted from video encoder 200 to video decoder 300 compared to systems that explicitly signal the first weighting factor, which may reduce a power consumption of video encoder 200 and/or video decoder 300 and/or improve a performance of video encoder 200 and/or video decoder 300 compared to systems that explicitly signal the first weighting factor.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
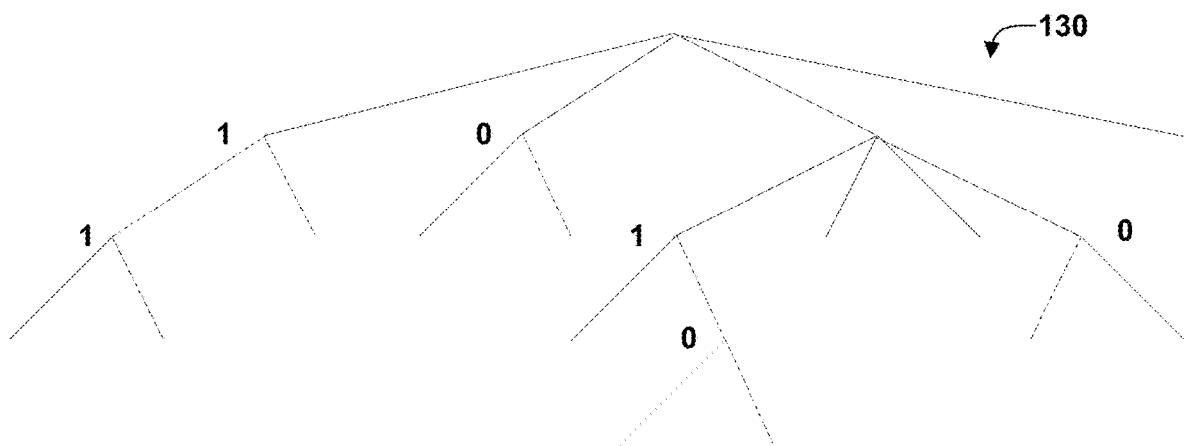
FIGS. 2A and 2B are conceptual diagrams illustrating an example quadtree binary tree (QTBT) structure, and a corresponding coding tree unit (CTU).
Figure 2B:
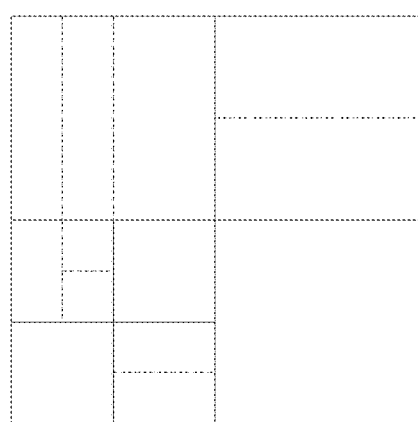

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

In HEVC, the largest coding unit in a slice is called a coding tree block (CTB) or coding tree unit (CTU). A CTB contains a quad-tree the nodes of which are coding units. The size of a CTB can range from 16×16 to 64×64 in the HEVC main profile (although technically 8×8 CTB sizes can be supported). A coding unit (CU) could be the same size of a CTB to as small as 8×8. Video encoder 200 and/or video decoder 300 may code each coding unit with one mode, i.e. inter or intra. When a CU is inter coded, video encoder 200 and/or video decoder 300 may further partition the CU into 2 or 4 prediction units (PUs) or become just one PU when further partition does not apply. When two PUs are present in one CU, the two PUs can be half size rectangles or two rectangle size with ¼ or ¾ size of the CU.

When the CU is inter coded, each PU has one set of motion information, which is derived with a unique inter prediction mode. In the HEVC standard, there are two inter prediction modes, named merge (skip is considered as a special case of merge) and advanced motion vector prediction (AMVP) modes respectively for a prediction unit (PU).

In either AMVP or merge mode, video encoder 200 and/or video decoder 300 may maintain a motion vector (MV) candidate list for multiple motion vector predictors. Video encoder 200 and/or video decoder 300 may be configured to generate the motion vector(s), as well as reference indices in the merge mode, of the current PU by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, video encoder 200 and/or video decoder 300 may be configured to use the reference pictures for the prediction of the current blocks, as well as the associated motion vectors are determined. Under AMVP mode for each potential prediction direction from either list 0 or list 1, video encoder 200 may be configured to explicitly signal a reference index needs, together with an MV predictor (MVP) index to the MV candidate list because the AMVP candidate contains only a motion vector. In AMVP mode, video encoder 200 and/or video decoder 300 may be configured to further refine the predicted motion vectors. Video encoder 200 and/or video decoder 300 may be configured to derive the candidates for both modes similarly from the same spatial and temporal neighboring blocks.

In accordance with the techniques of the disclosure, video encoder 200 and/or video decoder 300 may generate a first picture list (e.g., list 0 or simply "L0") and a second picture list (e.g., list 1 or simply "L1"). For instance, video decoder 300 may decode information signaled in a bitstream by video encoder 200 that indicates the first picture list and/or the second picture list. In some instances, video encoder 200 and/or video decoder 300 may derive the first picture list and/or the second picture list based on implicit techniques.

Video encoder 200 and/or video decoder 300 may select a first reference picture from the first picture list and/or a second reference picture from the second picture list. For example, video decoder 300 may decode information signaled in a bitstream by video encoder 200 that indicates an index of the first reference picture in the first picture list and/or a second reference picture from the second picture list. In some examples, video encoder 200 and/or video decoder 300 may select the first reference picture in the first picture list and/or a second reference picture from the second picture list based on implicit techniques.

Video encoder 200 and/or video decoder 300 may use the first reference picture in the first picture list and/or a second reference picture from the second picture list to determine a first weighting factor for a first reference picture. For example, video encoder 200 may determine the second weighting factor that results in a predicted block that minimizes a difference between a resulting predicted block and a current block. In this example, video encoder 200 may signal the second weighting factor in a bitstream. For instance, video encoder 200 may signal the second weighting factor within a symbol for a reference index that indicates (e.g., specifies) the second reference picture in the second picture list. More specifically, for example, video encoder 200 may signal the second weighting factor within a symbol for a reference index using binarization according to selection probability as described further herein, using truncated binary as described further herein, or another technique. Video decoder 300 may decode the second weighting factor and generate the first weighting factor for a first reference picture in a first reference picture based on the second weighting factor in accordance with techniques described herein. In some examples, video encoder 200 and/or video decoder 300 derive the first weighting factor and the second weighting factor based on implicit techniques.

Figure 3B:
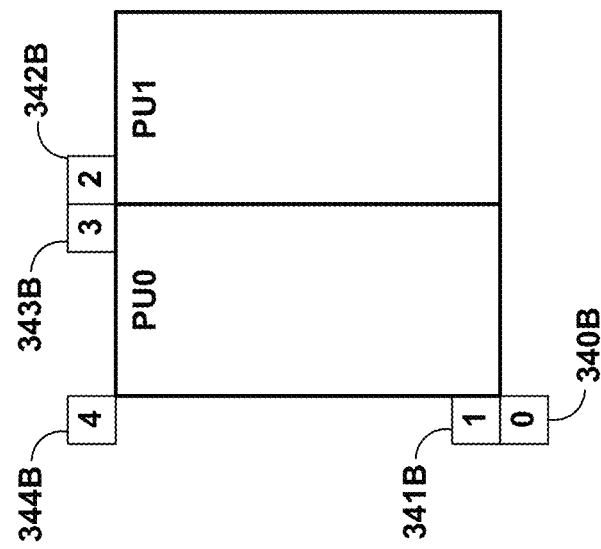
FIG. 3B is a conceptual diagram illustrating example spatial neighboring MV candidates for advanced motion vector prediction (AMVP) mode.
Figure 3A:
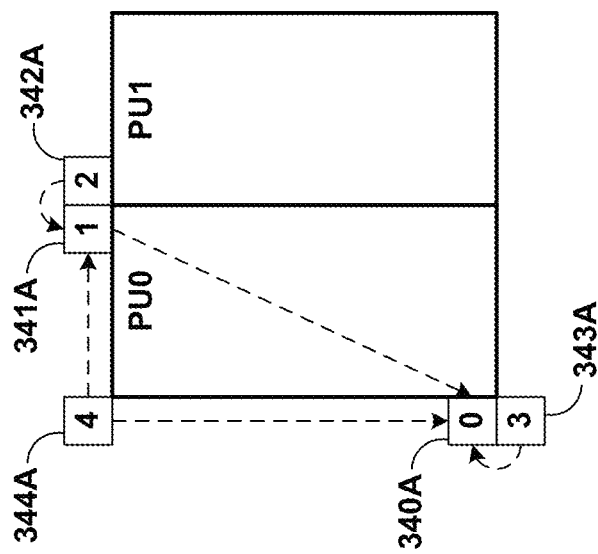
FIG. 3A is a conceptual diagram illustrating example spatial neighboring motion vector (MV) candidates for merge mode.

FIG. 3A is a conceptual diagram illustrating example spatial neighboring motion vector candidates 340A-344A for merge mode. FIG. 3B is a conceptual diagram illustrating example spatial neighboring motion vector candidates for advanced motion vector prediction mode. Video encoder 200 and/or video decoder 300 may be configured to derive spatial candidates from the neighboring blocks shown in FIGS. 3A and 3B, for a specific PU (PU$_0$), although the techniques for generating the candidates from the blocks differ for merge and AMVP modes.

In the merge mode example shown in FIG. 3A, video encoder 200 and/or video decoder 300 may be configured to derive up to four spatial MV candidates with the orders showed in FIG. 3A with numbers, and the order is the following: left (0, A1), above (1, B1), above right (2, B0), below left (3, A0), and above left (4, B2). For example, video encoder 200 or video decoder 300 may determine a first spatial MV candidate using block 340A, a second spatial MV candidate using block 341A, a third spatial MV candidate using block 343A, and a fourth spatial MV candidate using block 344A.

In the AVMP mode example shown in FIG. 3B, video encoder 200 and/or video decoder 300 may be configured to divide neighboring blocks into two groups: left group consisting of the block 340B and block 341B, and above group consisting of block 342B, 343B, and 344B as shown in FIG. 3B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, video encoder 200 and/or video decoder 300 may be configured to scale the first available candidate to form the final candidate, thus the temporal distance differences can be compensated.

Figure 4B:
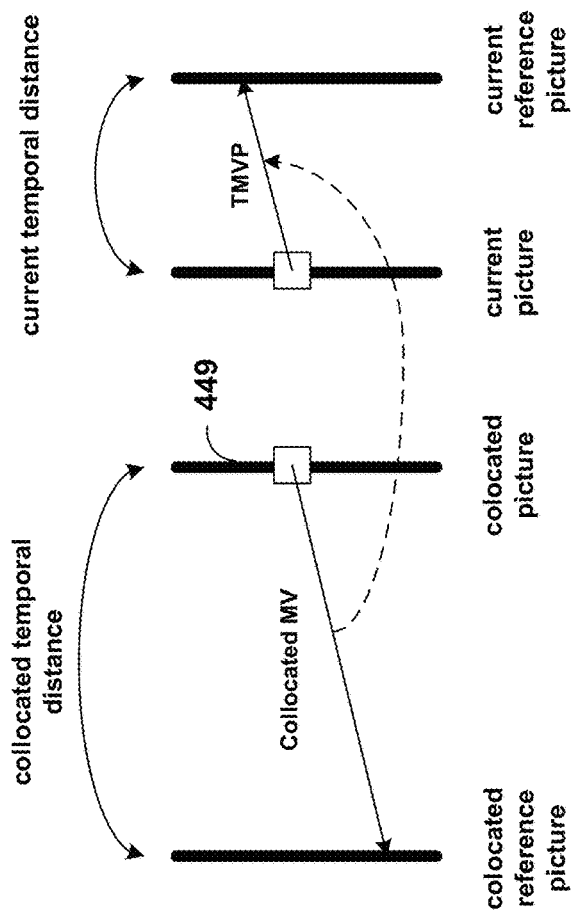
FIG. 4B is a conceptual diagram illustrating example motion vector scaling.
Figure 4A:
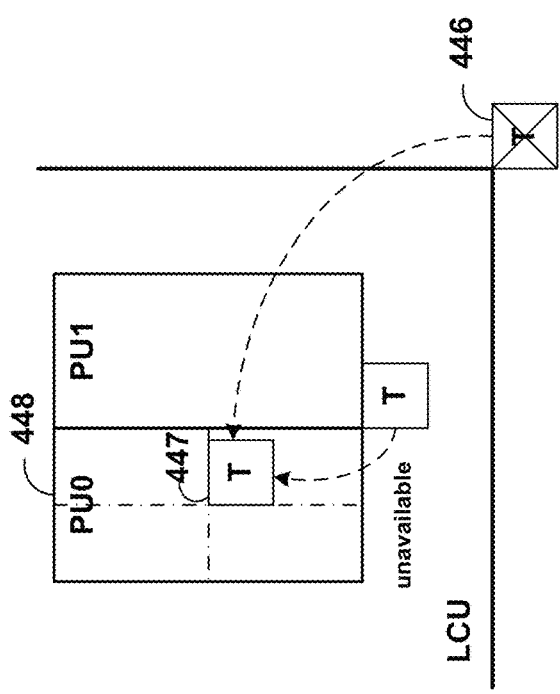
FIG. 4A is a conceptual diagram illustrating an example temporal motion vector predictor (TMVP) candidate.

FIG. 4A is a conceptual diagram illustrating an example temporal motion vector predictor (TMVP) candidate. FIG. 4B is a conceptual diagram illustrating example motion vector scaling. Video encoder 200 and/or video decoder 300 may be configured to add a TMVP candidate, if enabled and available, into the MV candidate list after spatial motion vector candidates. The process of motion vector derivation for TMVP candidate may be the same for both merge and AMVP modes, however the target reference index for the TMVP candidate in the merge mode is always set to 0.

The primary block location for TMVP candidate derivation is the bottom right block outside of the collocated PU as shown in FIG. 4A as a block "T" 446, to compensate the bias to the above and left blocks used to generate spatial neighboring candidates. However, if block T 446 is located outside of the current CTB row or motion information is not available, video encoder 200 and/or video decoder 300 may be configured to substitute the block with a center block 447 of the PU 448.

FIG. 4B is a conceptual diagram illustrating example motion vector scaling. In the example of FIG. 4B, video encoder 200 and/or video decoder 300 may be configured to derive a motion vector for TMVP candidate from the co-located PU of the co-located picture 449, indicated in the slice level. The motion vector for the co-located PU is called collocated MV.

Similar to temporal direct mode in AVC, to derive the TMVP candidate motion vector, video encoder 200 and/or video decoder 300 may be configured to scale the co-located MV to compensate the temporal distance differences, as shown in FIG. 4B. Motion vector scaling is discussed in the following. The value of motion vectors may be proportional to the distance of pictures in the presentation time. A motion vector may associate two pictures, the reference picture, and the picture containing the motion vector (namely the containing picture). When video encoder 200 and/or video decoder 300 utilize a motion vector to predict the other motion vector, video encoder 200 and/or video decoder 300 may be configured to calculate the distance of the containing picture and the reference picture based on the Picture Order Count (POC) values.

For a motion vector to be predicted, both containing picture associated with the motion vector and reference picture may be different. Therefore, video encoder 200 and/or video decoder 300 may be configured to calculate a new distance (based on POC). In some examples, video encoder 200 and/or video decoder 300 may be configured to scale the motion vector based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation is discussed in the following. If a motion vector candidate list is not complete, video encoder 200 and/or video decoder 300 may be configured to generate artificial motion vector candidates and insert the artificial motion vector candidates at the end of the list until it will have all candidates.

In merge mode, there are two types of artificial MV candidates: combined candidate derived only for B-slices and zero candidates used only for AMVP if the first type does not provide enough artificial candidates. For each pair of candidates that are already in the candidate list and have necessary motion information, video encoder 200 and/or video decoder 300 may be configured to derive bi-directional combined motion vector candidates by a combination of the motion vector of the first candidate referring to a picture in the list 0 and the motion vector of a second candidate referring to a picture in the list 1.

Pruning process for candidate insertion is discussed in the following. Candidates from different blocks may happen to be the same, which decreases the efficiency of a merge/AMVP candidate list. Video encoder 200 and/or video decoder 300 may be configured to apply a pruning process to solve this problem. The pruning process compares one candidate against the others in the current candidate list to avoid inserting identical candidate in certain extent. To reduce the complexity, video encoder 200 and/or video decoder 300 may be configured to apply only limited numbers of pruning process instead of comparing each potential one with all the other existing ones.

In development of Versatile Video Coding (VVC), there are several inter coding tools which derive or refine the candidate list of motion vector prediction or merge prediction for current block.

Zhang, et al. "CE4-related: History-based Motion Vector Prediction," Joint Video Experts Team (JVET) of ITU-T SG 16 WP 3 and ISO/IEC JTC 1/SC 29/WG 11, 11$^{th}$ Meeting: Ljubljana, SI, 10-18 Jul. 2018, JVET-K0104-v5 (hereinafter "JVET-K0104") describes a History-based motion vector prediction (HMVP) is a history-based process that allows each block to find a respective block's MV predictor from a list of MVs decoded from the past in additional to those in immediately adjacent causal neighboring motion fields. Video encoder 200 and/or video decoder 300 may be configured to maintain a table with multiple HMVP candidates during the encoding/decoding process. Video encoder 200 and/or video decoder 300 may be configured to empty the table when a new slice is encountered. Whenever there is an inter-coded block, video encoder 200 and/or video decoder 300 may be configured to insert the associated motion information to the table in a first-in-first-out (FIFO) fashion as a new HMVP candidate. Video encoder 200 and/or video decoder 300 may be configured to a apply constraint FIFO rule. When inserting a HMVP to the table, video encoder 200 and/or video decoder 300 may be configured to apply a redundancy check to find whether there is an identical HMVP in the table. If found, video encoder 200 and/or video decoder 300 may be configured to remove that particular HMVP from the table and move all the HMVP candidates afterwards.

HMVP candidates could be used in the merge candidate list construction process. Video encoder 200 and/or video decoder 300 may be configured to insert all HMVP candidates from the last entry to the first entry in the table after the TMVP candidate. Video encoder 200 and/or video decoder 300 may be configured to apply pruning on the HMVP candidates. Once the total number of available merge candidates reaches the signaled maximally allowed merge candidates, video encoder 200 and/or video decoder 300 may be configured to terminate the merge candidate list construction process.

Similarly, video encoder 200 and/or video decoder 300 may be configured to use HMVP candidates in the AMVP candidate list construction process. For example, video encoder 200 and/or video decoder 300 may be configured to insert the motion vectors of the last K HMVP candidates in the table after the TMVP candidate. Video encoder 200 and/or video decoder 300 may be configured to use only HMVP candidates with the same reference picture as the AMVP target reference picture to construct the AMVP candidate list. Video encoder 200 and/or video decoder 300 may be configured to apply pruning on the HMVP candidates.

Video encoder 200 and/or video decoder 300 may be configured to use pairwise average candidates in Chen, et al. "Algorithm description for Versatile Video Coding and Test Model 3 (VTM 3)," Joint Video Experts Team (JVET) of ITU-T SG 16 WP 3 and ISO/IEC JTC 1/SC 29/WG 11, 12$^{th}$ Meeting: Macao, CN, 3-12 Oct. 2018, JVET-L1002-v1 (hereinafter "VTM3.0"). Video encoder 200 and/or video decoder 300 may be configured to generate pairwise average candidates by averaging predefined pairs of candidates in the current merge candidate list (includes spatial candidates, TMVP, and HMVP), and the predefined pairs are defined as {(0, 1), (0, 2), (1, 2), (0, 3), (1, 3), (2, 3)}, where the numbers denote the merge indices to the merge candidate list. Video encoder 200 and/or video decoder 300 may be configured to calculate the averaged motion vectors separately for each reference list. If both motion vectors are available in one list, video encoder 200 and/or video decoder 300 may be configured to average these two motion vectors even when they point to different reference pictures; if only one motion vector is available, use the one directly; if no motion vector is available, keep this list invalid. The pairwise average candidates replace the combined candidates in HEVC standard.

FIG. 5A is a conceptual diagram illustrating example neighboring samples 553A-553H of a current coding unit (CU) 551 used for deriving illumination compensation (IC) parameters. FIG. 5B is a conceptual diagram illustrating example neighboring samples 557A-557H of a reference block 555 used for deriving IC parameters. LIC is based on a linear model for illumination changes, using a scaling factor a and an offset b. And LIC is enabled or disabled adaptively for each inter-mode coded coding unit (CU).

When LIC applies for a CU, video encoder 200 and/or video decoder 300 may be configured to employ a least square error process to derive the parameters a and b by using neighbouring samples 553A-553H of the current CU 551 and their corresponding reference samples. More specifically, as illustrated in FIG. 5A, video encoder 200 and/or video decoder 300 may be configured to use the subsampled (2:1 subsampling) neighbouring samples 553A-553H of the CU 551. In the example of FIG. 5B, video encoder 200 and/or video decoder 300 may be configured to use the corresponding pixels (identified by motion information of the current CU or sub-CU) in the reference picture. Video encoder 200 and/or video decoder 300 may be configured to derive the IC parameters and apply the IC parameters for each prediction direction separately.

When a CU is coded with merge mode, video encoder 200 and/or video decoder 300 may be configured to copy the LIC flag from neighbouring blocks, in a way similar to motion information copy in merge mode; otherwise, video encoder 200 may be configured to signal an LIC flag for the CU to indicate whether LIC applies or not.

In HEVC, Weighted Prediction (WP) is supported, where a scaling factor (denoted by a), a shift number (denoted by s) and an offset (denoted by b) is used in the motion compensation. Suppose the pixel value in position (x, y) of the reference picture is p(x, y), then video encoder 200 and/or video decoder 300 may be configured to use p'(x, y)=((a*p(x, y)+(1<<(s−1)))>>s)+b instead of p(x, y) as the prediction value in motion compensation.

When WP is enabled, for each reference picture of current slice, video encoder 200 may be configured to signal a flag to indicate whether WP applies for the reference picture or not. If WP applies for one reference picture, video encoder 200 may be configured to send a set of WP parameters (i.e., a, s and b) to video decoder 300 and video decoder 300 may use the set of WP parameters for motion compensation from the reference picture. To flexibly turn on/off WP for luma and chroma component, video encoder 200 may be configured to separately signal WP flag and WP parameters for luma and chroma components.

In WP, video encoder 200 and/or video decoder 300 may be configured to use one same set of WP parameters for all pixels in one reference picture. Depending on the type of slice (P_SLICE or B_SLICE), video encoder 200 and/or video decoder 300 may be configured to choose the weighting algorithm: (1) Default: the default HEVC uni-prediction or bi-prediction; (2) Explicit: the weighting factors are transmitted explicitly in the slice header; (3) Implicit: the weighting factors for bi-prediction are derived from the distance of the current POC with the POC of the reference pictures, relatively to the distance between references POC (B_SLICE only).

In the reference model of VVC, generalized bi-prediction (GBi) mode allows applying different weights to list 0 (L0) predictors and list 1 (L1) predictors. The supported weight sets include one equal-weight set and four unequal-weight sets. Video encoder 200 may be configured to explicitly signal the weight selection in GBi for one coding unit (CU) if this CU is coded by bi-prediction.

In an example bi-prediction, video encoder 200 and/or video decoder 300 may be configured to average the predictors from L0 and L1 to generate the final predictor using the equal weight 0.5. The predictor generation formula is shown as in Equation (1)

$$P_{TraditionalBiPred}=(P_{L0}+P_{L1}+\text{RoundingOffset})>>\text{shiftNum}, \quad (1)$$

In Equation (1), $P_{TraditionalBiPred}$ is the final predictor for the bi-prediction, $P_{L0}$ and $P_{L1}$ are predictors from L0 and L1, respectively, and RoundingOffset and shiftNum are used to normalize the final predictor. That is, $P_{L0}$ is a first predictor for the first reference picture and $P_{L1}$ is a second predictor for the second reference picture. In some examples, RoundingOffset is a predefined offset. In some examples, shiftNum is a predefined number of left shift operations.

In this disclosure, GBi is presented to allow applying different weights to predictors from L0 and L1. The predictor generation is shown in Equation (2).

$$P_{GBi}((1-w_1)*P_{L0}+w_1*P_{L1}+\text{RoundingOffset}_{GBi})\text{>>shiftNum}_{GBi}, \quad (2)$$

In Equation (2), $P_{GBi}$ is the final predictor of GBi. $(1-w_1)$ and $w_1$ are the selected GBi weights applied to the predictors of L0 and L1, respectively. $\text{RoundingOffset}_{GBi}$ and $\text{shiftNum}_{GBi}$ are used to normalize the final predictor in GBi. In accordance with one or more techniques described herein, a video coder (e.g., video encoder 200 or video decoder 300) may be configured to generate the prediction information by calculating equation 2.

In AMVP, if the inter prediction is bi-prediction, the GBi index is signaled based on truncated unary coding as shown in Table 1 and Table 2.

TABLE 1

Binarization of GBi index

| GBi Index | Weight value of $w_1$ | Binarization of GBi Index |
|---|---|---|
| 0 | −1/4 | 0000 |
| 1 | 3/8 | 001 |
| 2 | 1/2 | 1 |
| 3 | 5/8 | 01 |
| 4 | 5/4 | 0001 |

TABLE 2

Binarization of GBi index

| GBi Index | Weight value of $w_1$ | Binarization of GBi Index |
|---|---|---|
| 0 | 3/8 | 00 |
| 1 | 1/2 | 1 |
| 2 | 5/8 | 01 |

Weighted Prediction (WP) in HEVC has explicit mode in which weighting factors for each reference frame are coded and transmitted. For bi-directional prediction, video encoder 200 and/or video decoder 300 may be configured to code two weighting factors. There may be no default mode for normalized weighted prediction. For example, if weighting factor for the reference in list 0 is $w_0$, the weighting factor for the reference in the list 1 may be $1-w_0$. In this case, video encoder 200 and/or video decoder 300 may be configured to code only one weighting factor. Video encoder 200 and/or video decoder 300 may be configured to generate the other weighting factor by a default process.

In an example using normalized weighted prediction for bi-directional prediction, video encoder 200 and/or video decoder 300 may be configured to explicitly transmit one weighting factor of one reference and generate the weighting factor for the other reference by N minus this one, where N can be 1, 2, 3, 4, 5 or other numbers. Said differently, for example, a video coder (e.g., video encoder 200 or video decoder 300) may be configured to generate a first weighting factor for a first reference picture in a first picture list using a second weighting factor for a second reference picture in a second picture list. In some examples, the video coder may be configured to calculate N minus the second weighting factor, where N is greater than zero and in some examples an integer. In some instances, N is 1. For example, video decoder 300 may be configured to decode N from a bitstream for video data. Video encoder 200 may be configured to encode N in a bitstream for video data. In some examples, the value of N may be preset, and in such examples, video encoder 200 may not signal and video decoder 300 may not receive the value of N from the bitstream.

In an example using reference indices, video encoder 200 and/or video decoder 300 may be configured to indicate weighting factors for inter blocks coded by weighted prediction through selection of one or more reference indices. For example, video encoder 200 and/or video decoder 300 may be configured to code the weighting factor with the reference index of list 0 (or list 1 in the same way). In this example, "m" is the number of active references in each reference list and "n" is the number of weighting factors. For instance, m=2 and n=5, there are m×n=2×5=10 combinations. The binarization of reference index of list 0 (or list 1) with weighting factors is as below. The binarization of reference index of list 1 (or list 0) may not change. For example, in the decoder side (e.g., video decoder 300), if the decoded value of reference index of list 0 is 00001, the reference index of list 0 is 0, the associated weighting factor of this reference frame in list 0 is 3/8, and the weighting factor of reference in list 1 is 1 3/8=5/8.

TABLE 1 binarization of reference index of list 0 (or list 1) with weighting factors

| Reference Index of List 0 | Weight value of w | Binarization |
|---|---|---|
| 0 | 1/2 | 1 |
| 1 | 1/2 | 01 |
| 0 | 5/8 | 001 |
| 1 | 5/8 | 0001 |
| 0 | 3/8 | 00001 |
| 1 | 3/8 | 000001 |
| 0 | 5/4 | 0000001 |
| 1 | 5/4 | 00000001 |
| 0 | −1/4 | 000000001 |
| 1 | −1/4 | 000000000 |

Said differently, for example, a video coder (e.g., video encoder 200 or video decoder 300) may be configured to select a second reference picture from a plurality of reference pictures of the second picture list using a reference index and determine the second weighting factor using the reference index. For instance, video decoder 300 may be configured to decode the reference index from a bitstream for video data. Similarly, video encoder 200 may be configured to encode the reference index in a bitstream for video data.

In the example using normalized weighted prediction for bi-directional prediction, video encoder 200 and/or video decoder 300 may be configured to change the binarization of reference index with a weighting factor according to a selection probability. For example, video encoder 200 and/or video decoder 300 may be configured to code a higher-probability combination in fewer bits than a lower-probability combination.

In the example using normalized weighted prediction for bi-directional prediction, video encoder 200 and/or video decoder 300 may be configured to code the combination of reference index and weighting factor in other processes such as the following truncated binary coding example.

TABLE 2 truncated binary coding example

| Reference Index of List 0 | Weight value of w | Binarization |
|---|---|---|
| 0 | 1/2 | 000 |
| 1 | 1/2 | 001 |
| 0 | 5/8 | 010 |
| 1 | 5/8 | 011 |
| 0 | 3/8 | 100 |
| 1 | 3/8 | 101 |
| 0 | 5/4 | 1100 |
| 1 | 5/4 | 1101 |
| 0 | −1/4 | 1110 |
| 1 | −1/4 | 1111 |

Video encoder 200 and/or video decoder 300 may be configured to code the weighting factor with the reference index of list 0 and list 1. Video encoder 200 and/or video decoder 300 may be configured to derive a weighting factor by decoding the reference indexes of list 0 and list 1.

In the example using reference indices, there are "m" weighting factors and video encoder 200 and/or video decoder 300 may divide the m weighting factors into "x" bands. Each band includes $a_i$ weighting factors. Video encoder 200 and/or video decoder 300 may be configured to code a band index with a reference index of list 1 (or List 0) and code a weighting factor in the band with a reference index of list 0 (or list 1). For example, the number of active references in each list and the number of weighting factors may be the same as the example of Table 1. Video encoder 200 and/or video decoder 300 may be configured to divide the set of weighing factors into 3 bands, where band 0 includes {½}, band 1 includes {⅝, ⅜}, and band 2 includes {5/4, −¼} as shown in Table 3.

TABLE 3

An example set of weighing factors divided into 3 bands

| Band | Weighting factor | Reference index of list 1 | Reference of List 1 Binarization | Reference index of list 0 | Reference of List 0 Binarization |
|---|---|---|---|---|---|
| Band 0 | 1/2 | 0 | 1 | 0 | 1 |
|  |  |  |  | 1 | 01 |
|  |  | 1 | 01 | 0 | 1 |
|  |  |  |  | 1 | 01 |
| Band 1 | 5/8 | 0 | 001 | 0 | 1 |
|  |  |  |  | 1 | 01 |
|  |  | 1 | 0001 | 0 | 1 |
|  |  |  |  | 1 | 01 |
|  | 3/8 | 0 | 001 | 0 | 001 |
|  |  |  |  | 1 | 000 |
|  |  | 1 | 0001 | 0 | 001 |
|  |  |  |  | 1 | 000 |
| Band 2 | 5/4 | 0 | 00001 | 0 | 1 |
|  |  |  |  | 1 | 01 |
|  |  | 1 | 00000 | 0 | 1 |
|  |  |  |  | 1 | 01 |
|  | −1/4 | 0 | 00001 | 0 | 001 |
|  |  |  |  | 1 | 000 |
|  |  | 1 | 00000 | 0 | 001 |
|  |  |  |  | 1 | 000 |

Said differently, for example, a video coder (e.g., video encoder 200 or video decoder 300) may be configured to determine a second weighting factor using a band of a plurality of bands, each band of the plurality of bands including a plurality of weight factors.

In the example using reference indices, video encoder 200 and/or video decoder 300 may be configured to change the binarization of reference index with weighting factor according to selection probability. A higher-probability combination may be coded in fewer bits.

In the example using reference indices, video encoder 200 and/or video decoder 300 may be configured to code the combinations of reference index and weighting factor in other processes such as truncated binary encoding.

Normalization mode flag, the weighting factors, and the sum N (for example, N equal to 1) of two weighting factors of a bi-prediction block can be pre-defined in both encoder side (e.g., video encoder 200) and decoder side (e.g., video decoder 300), or be set as a set of values signaled from the encoder to the decoder at sequence level, picture level, slice level, tile level or block level. For example, video encoder 200 may be configured to signal one or more of a normalization mode flag, one or more weighting factors, or a sum N (for example, N equal to 1) of two weighting factors of a bi-prediction block in a Sequence Parameter Set (SPS), Picture Parameter Set (PPS), Slice header (SH), Tile, Coding Tree Unit (CTU) or Coding Unit (CU).

In some examples, video encoder 200 and/or video decoder 300 may be configured to use a weighted prediction coding process, where the weighting factors can be any values.

Video encoder 200 and/or video decoder 300 may be configured to impose an extra constraint on weighted bi-prediction. For example, video encoder 200 may be configured to signal a picture-level flag, referred to as constrained_wbi_indicator, when the picture-level flag, referred to as weighted_bipred_flag, is set equal to 1 and the slice type is B-Slice. Video encoder 200 and/or video decoder 300 may be configured to use these indicators to specify the number of weighting factors in addition to ½. When constrained_wbi_flag is set equal 0, video decoder 300 may be configured to perform the weighted bi-prediction as-is without change. Otherwise, when constrained_wbi_flag is set equal to n (where n=1, 2, 3, . . . ), video decoder 300 may be configured to perform the constrained weighted bi-prediction performs as follows in the description of the extension of reference index process, the description of constrained weighted factor assignment, and the description of the mapping function from the L1 reference index to the reference picture.

In an example extension of reference index process, video encoder 200 and/or video decoder 300 may be configured to allow the slice-level indicator (num_ref_idx_l1_active_minus1) to go beyond its maximal value (i.e. 14). For example, there are 15 reference pictures in List 1 at maximum. In this way, video encoder 200 and/or video decoder 300 may be configured to code extra reference indices beyond 14 reference pictures as a suffix appended to the truncated unary code of num_ref_idx_l0_active_minus1 and num_ref_idx_l1_active_minus1. Specifically, for example, this suffix is represented by using truncated binary code.

In an example constrained weighted factor assignment, video encoder 200 and/or video decoder 300 may be configured to couple only weighting factors with the reference pictures in List 1, while the respective weighting factors of reference pictures in List 0 are determined depending on whichever reference picture in List 1 is selected. For example, if the weighting factor of a L1 reference picture is w, video encoder 200 and/or video decoder 300 may be configured to determine the weighting factor of each L0 reference picture is N−w, where N follows the same rule as proposed in the normalized weighted prediction process described herein.

In an example mapping function from L1 reference index to reference picture and weighting factor, video encoder 200 and/or video decoder 300 may be configured to apply a mapping function from a reference index to a reference picture and weighting factors as follows. Supposing there are m reference pictures $\{p_1(0), p_1(1), \ldots, p_1(m-1)\}$ in List 1 and n weighting factors $\{w_0, w_1, \ldots, w_{n-1}\}$, video encoder 200 and/or video decoder 300 may be configured to map the first m reference indices (e.g., m reference pictures with the weighting factor of $w_0$) following the same ordered sequence as $\{p_1(0), p_1(1), \ldots, p_1(m-1)\}$ with $w_0$, and map the second m reference indices (e.g., m reference pictures with the weighting factor of $w_1$) in the above same way but the associated weighting factor is $w_1$, and so on. Specifically, this mapping function from a received L1 reference ($r_1$) to reference picture ($p_1(i)$) and weighting factor ($w_j$) can be formulated as follows:

$$i = r_1 \% n,$$

$$j = \text{floor}(r_1/n).$$

In this disclosure, for example, the actual number of reference pictures in List 1 may be equal to m by n. Table 4 below gives an example with m=3 and n=3.

TABLE 4 reference pictures in List 1

| RefIdx L1 | 0 | 1 | 2 | 3 | 4 | 5 | 6 | 7 | 8 |
|---|---|---|---|---|---|---|---|---|---|
| RefPic L1 | $p_1(0)$ | $p_1(1)$ | $p_1(2)$ | $p_1(0)$ | $p_1(1)$ | $p_1(2)$ | $p_1(0)$ | $p_1(1)$ | $p_1(2)$ |
| Weight L1 | $w_0$ | $w_0$ | $w_0$ | $w_1$ | $w_1$ | $w_1$ | $w_2$ | $w_2$ | $w_2$ |

Supposing there are 4 reference pictures $\{p_0(0), p_0(1), p_0(2), p_0(3)\}$ in List 0 and the received reference index is 6 from Table 4, then Table 5 below gives an example of weighting factor assignment for L0.

TABLE 5 examples of weighting factor assignment for L0

| RefIdx L0 | 0 | 1 | 2 | 3 |
|---|---|---|---|---|
| RefPic L0 | $p_0(0)$ | $p_0(1)$ | $p_0(2)$ | $p_0(0)$ |
| Weight L0 | $N - w_2$ | $N - w_2$ | $N - w_2$ | $N - w_2$ |

Video encoder 200 and/or video decoder 300 may be configured to assign the ½ weighting factor to either $w_0$ or $w_1$ for signalling efficiency.

In the foregoing examples, all L0 and L1 in the above description can be swapped. Said differently, for example, the first picture list may be list 0 (L0) and the second picture list may be list 1 (L1) or the first picture list may be list 1 (L1) and the second picture list may be list 0 (L0).

Figure 6:
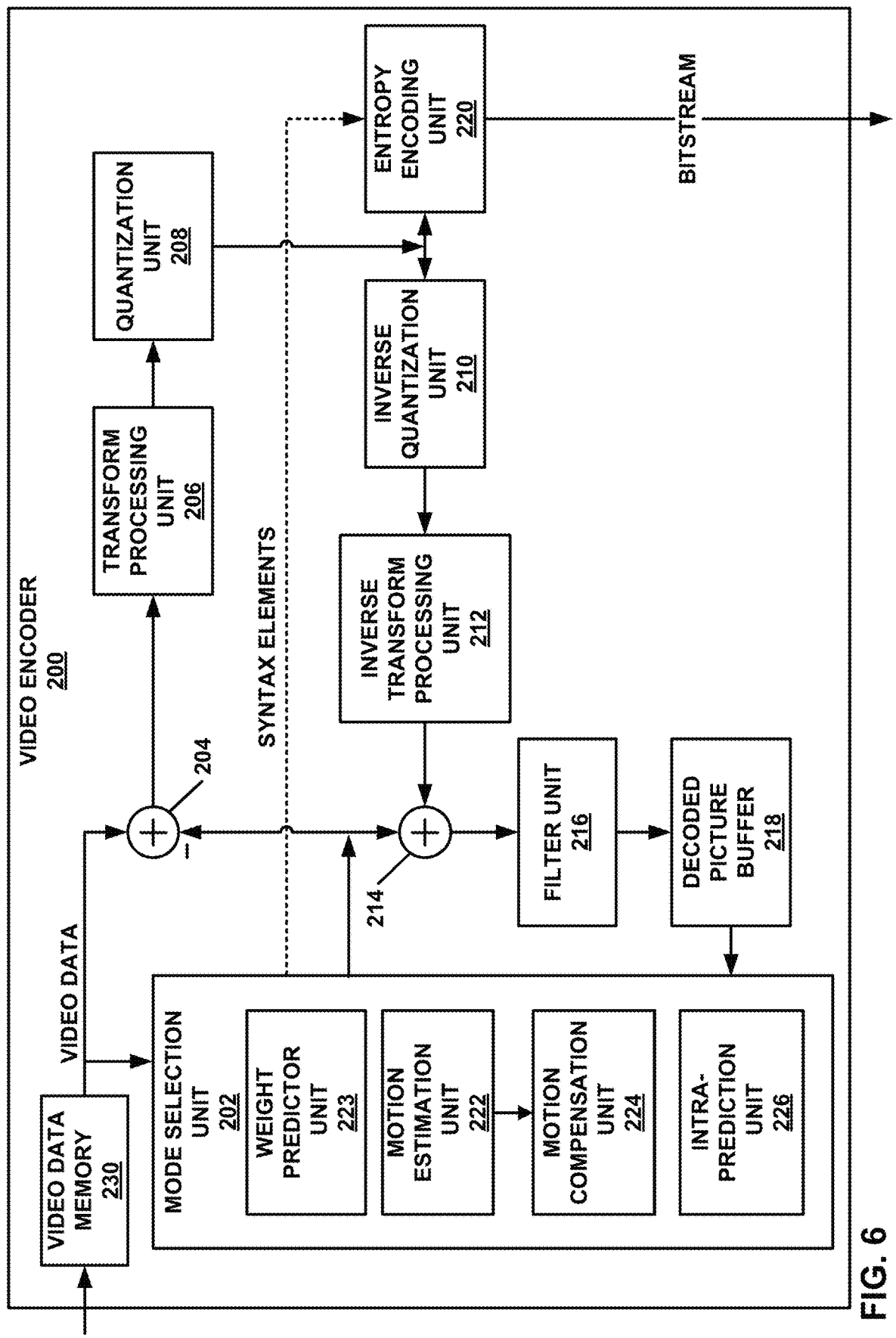
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, weight predictor unit 223, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate, with weight predictor unit 223, a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine, weight predictor unit 223, the retrieved data, e.g., through sample-by-sample averaging or weighted averaging.

Motion selection unit 202 and, more specifically, weight predictor unit 223 may be configured to generate a first weighting factor for a first reference picture in a first picture list using a second weighting factor for a second reference picture in a second picture list.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction.

Video encoder 20 and video decoder 30 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to generate a first weighting factor for a first reference picture in a first picture list using a second weighting factor for a second reference picture in a second picture list and generate prediction information for a current block of the video data using the first weighting factor and the second weighting factor.

Figure 7:
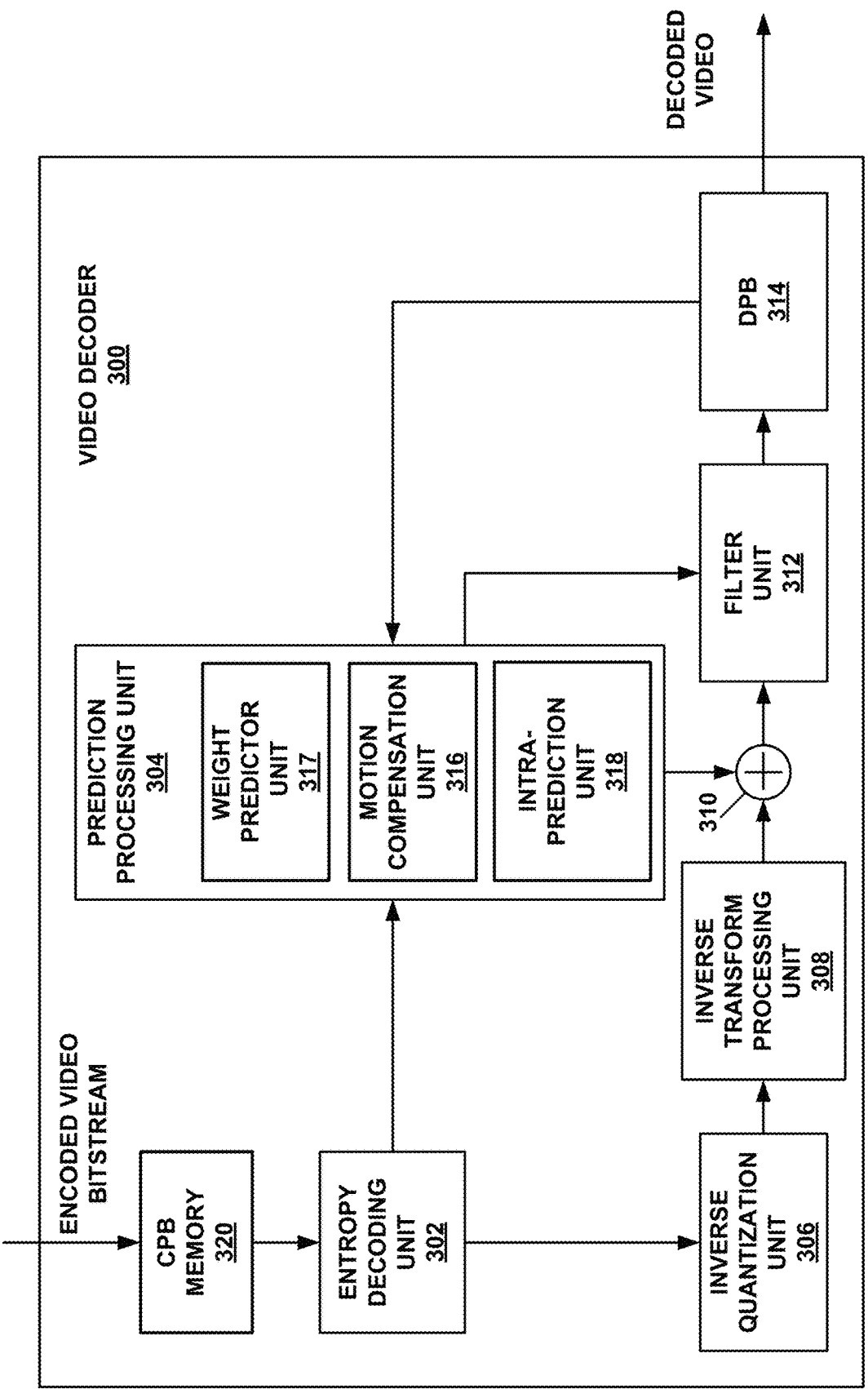
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 318), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random-access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally, or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate, with weight predictor unit 317, the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6). For example, prediction processing unit 304 and, more specifically, weight predictor unit 317 may be configured to generate a first weighting factor for a first reference picture in a first picture list using a second weighting factor for a second reference picture in a second picture list.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to generate a first weighting factor for a first reference picture in a first picture list using a second weighting factor for a second reference picture in a second picture list and generate prediction information for a current block of the video data using the first weighting factor and the second weighting factor.

Figure 8:
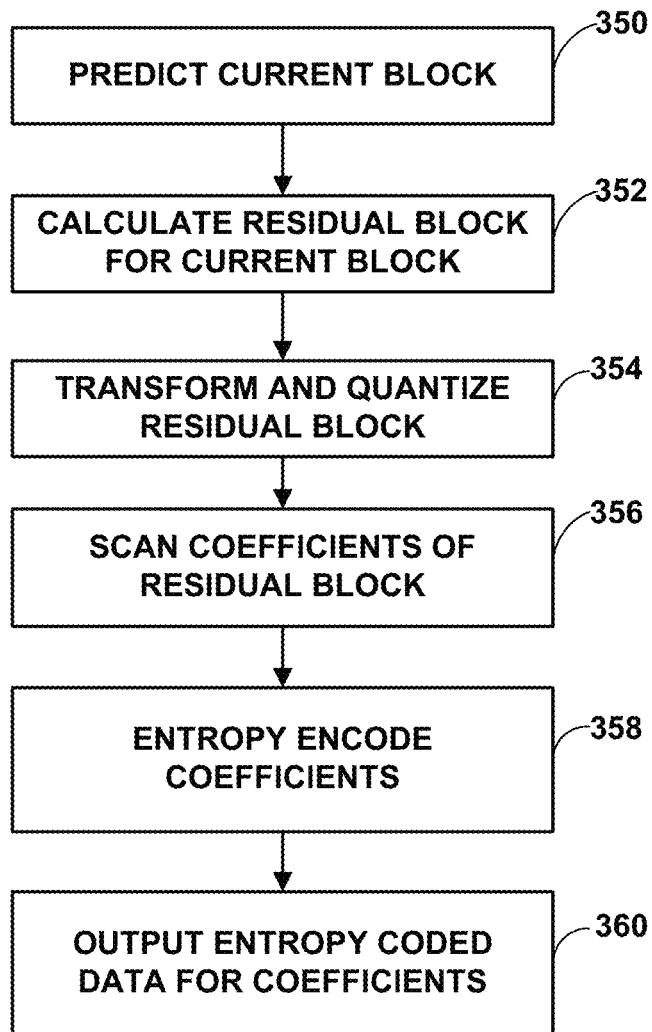
FIG. 8 is a flowchart illustrating an example encoding process.

FIG. 8 is a flowchart illustrating an example method for encoding a current block. The current block may comprise a current CU. Although described with respect to video encoder 200 (FIGS. 1 and 2), it should be understood that other devices may be configured to perform a method similar to that of FIG. 8.

In this example, video encoder 200 initially predicts the current block (350). For example, video encoder 200 may form a prediction block for the current block. In some examples, video encoder 200 may generate a first weighting factor for a first reference picture in a first picture list using a second weighting factor for a second reference picture in a second picture list and generate prediction information using the first weighting factor and the second weighting factor.

Video encoder 200 may then calculate a residual block for the current block (352). For example, video encoder 200 may generate a residual block for the current block using the current block and the prediction information and encode the residual block as follows. To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 9:
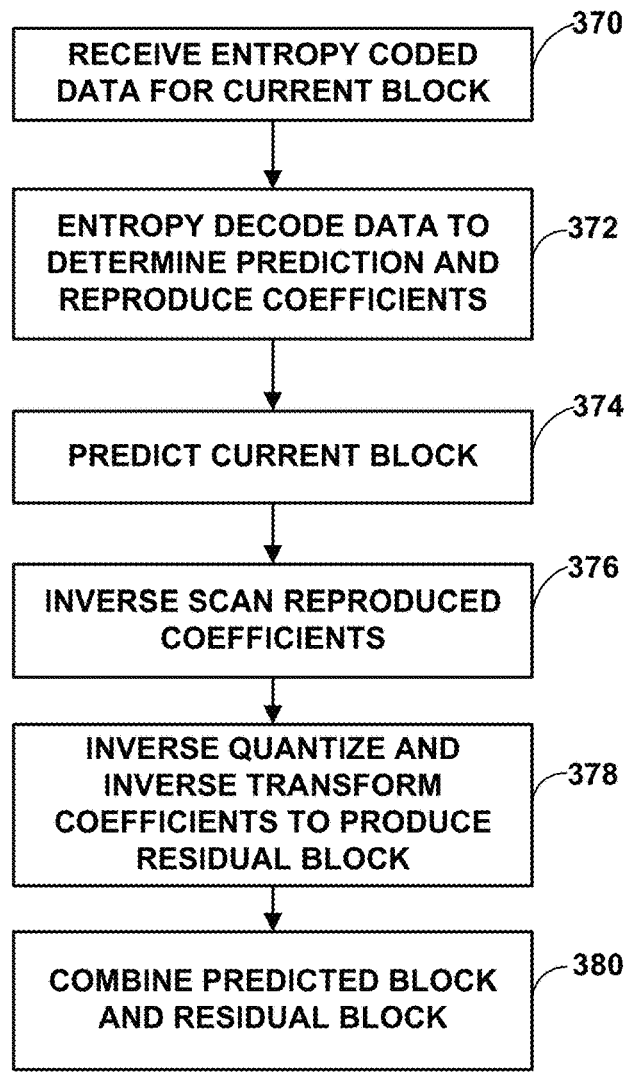
FIG. 9 is a flowchart illustrating an example decoding process.

FIG. 9 is a flowchart illustrating an example method for decoding a current block of video data. The current block may comprise a current CU. Although described with respect to video decoder 300 (FIGS. 1 and 3), it should be understood that other devices may be configured to perform a method similar to that of FIG. 9.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. In some examples, video decoder 300 may generate a first weighting factor for a first reference picture in a first picture list using a second weighting factor for a second reference picture in a second picture list and generate prediction information using the first weighting factor and the second weighting factor. In this example, video decoder 300 may predict the current block using the prediction information. For instance, video decoder 300 may predict the current block by applying equation 2 with the first weighting factor and the second weighting factor.

Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380). For example, video decoder 300 may decode a residual block for the current block and decode the current block using the prediction information and the residual block.

Figure 10:
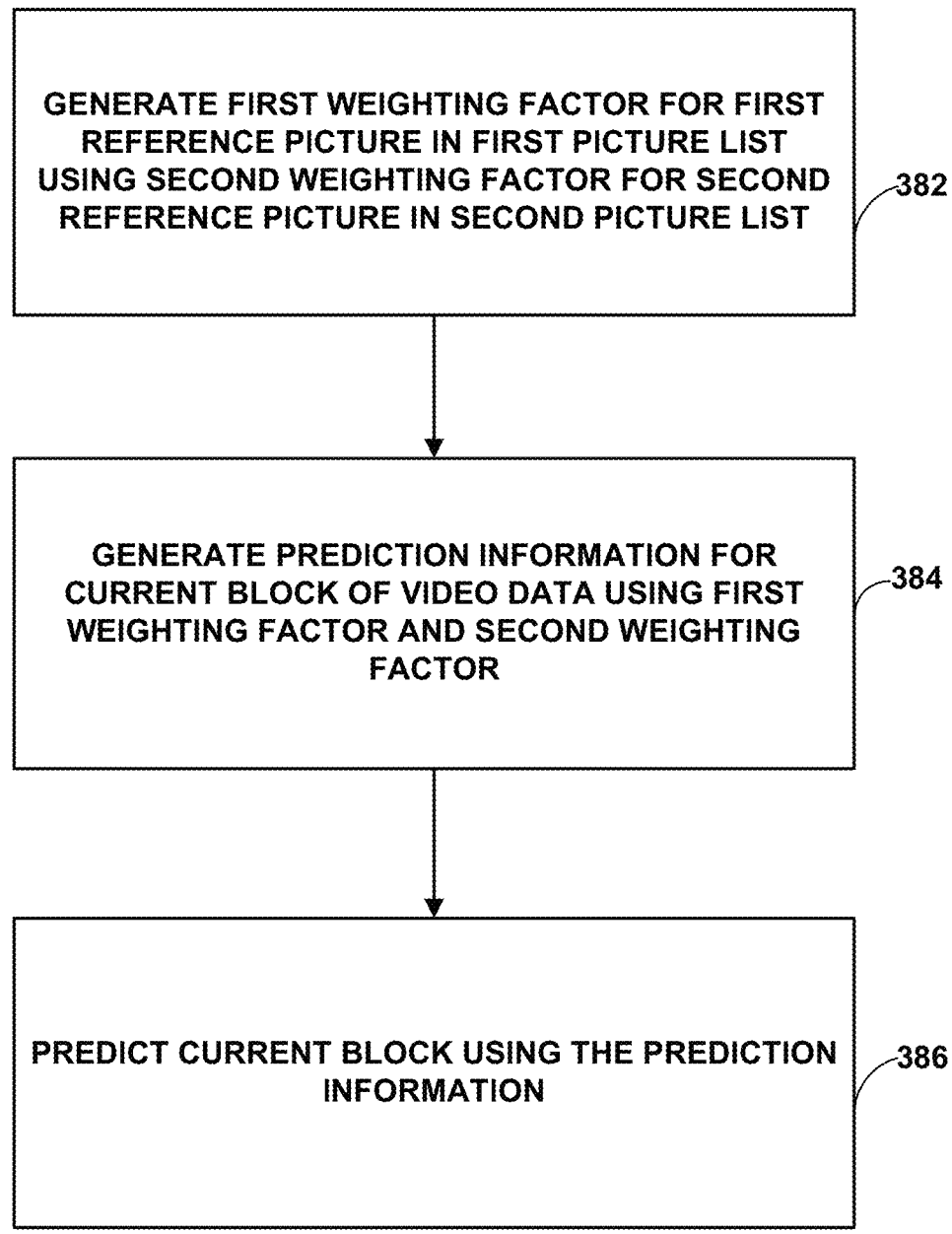
FIG. 10 is a flowchart illustrating an example process for weight prediction.

FIG. 10 is a flowchart illustrating an example process for weight prediction. The current block may comprise a current CU. Although described with respect to video encoder 200 (FIGS. 1 and 2), it should be understood that other devices may be configured to perform a method similar to that of FIG. 10.

In this example, a video coder (e.g., video encoder 200 or video decoder 300) may be configured to generate a first weighting factor for a first reference picture in a first picture list using a second weighting factor for a second reference picture in a second picture list (382). For example, weight predictor unit 223 of video encoder 200 may be configured to generate a first weighting factor for a first reference picture in a first picture list using a second weighting factor for a second reference picture in a second picture list. in some examples, weight predictor unit 317 of video decoder 300 may be configured to generate a first weighting factor for a first reference picture in a first picture list using a second weighting factor for a second reference picture in a second picture list.

The video coder may be configured to generate prediction information for a current block of the video data using the first weighting factor and the second weighting factor (384). For example, the video coder may calculate equation 2 using the first weighting factor and the second weighting factor. The video coder may be configured to predict the current block using the prediction information (386). For example, mode selection unit 202 of video encoder 200 may predict the current block using the prediction information. In some examples, prediction processing unit 304 of video decoder 300 may predict the current block using the prediction information.

Illustrative examples of the disclosure include:

Example 1: A method of processing video data, the method comprising: generating a first weighting factor for a first reference picture in a first picture list using a second weighting factor for a second reference picture in a second picture list; and generating prediction information using the first weighting factor and the second weighting factor.

Example 2: The method of example 1, wherein generating the first weighting factor comprises: calculating N minus the second weighting factor, wherein N is an integer.

Example 3: The method of example 2, wherein N is signaled.

Example 4: The method of any one of examples 1-3, further comprising: determining the second weighting factor using a selection of reference indices, wherein generating the first weighting factor comprises generating the first weighting factor based on the determined second weighting factor.

Example 5: The method of any one of examples 1-4, further comprising: determining the second weighting factor using a band.

Example 6: The method of any of examples 1-5, wherein the first picture list is list 0 (L0) and the second picture list is list 1 (L1); or wherein the first picture list is list 1 (L1) and the second picture list is list 0 (L0).

Example 7: The method of any of examples 1-6, further comprising: decoding a current block based on the prediction information.

Example 8: The method of any of examples 1-6, further comprising: encoding a current block based on the prediction information.

Example 9: A device for coding video data, the device comprising one or more means for performing the method of any of examples 1-6.

Example 10: The device of example 9, wherein the one or more means comprise one or more processors implemented in circuitry.

Example 11: The device of any of examples 9 and 10, further comprising a memory to store the video data.

Example 12: The device of any of examples 9-11, further comprising a display configured to display decoded video data.

Example 13: The device of any of examples 9-12, wherein the device comprises one or more of a camera, a computer, a mobile device, a broadcast receiver device, or a set-top box.

Example 14: The device of any of examples 9-13, wherein the device comprises a video decoder.

Example 15: The device of any of examples 9-14, wherein the device comprises a video encoder.

Example 16: A computer-readable storage medium having stored thereon instructions that, when executed, cause one or more processors to perform the method of any of examples 1-6.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   selecting, by one or more processors implemented in circuitry, a first reference picture in a first picture list;
   determining, by the one or more processors, a binarization value from a plurality of binarization values, the binarization value being assigned both a reference index configured to specify whether a second reference picture is in the first picture list or a second picture list and a second weighting factor for the second reference picture;
   determining, by the one or more processors, based on the binarization value, both the reference index assigned to the binarization value and the second weighting factor assigned to the binarization value;
   selecting, by the one or more processors, the second reference picture from a plurality of reference pictures of the second picture list using the reference index assigned to the binarization value;
   generating, by the one or more processors, a first weighting factor for the first reference picture in the first picture list using the second weighting factor assigned to the binarization value; and
   generating, by the one or more processors, prediction information for a current block of the video data using the first weighting factor and the second weighting factor.

2. The method of claim 1, wherein generating the first weighting factor comprises:
   calculating N minus the second weighting factor, wherein N is an integer.

3. The method of claim 2, wherein N is 1.

4. The method of claim 2, further comprising:
   decoding, by the one or more processors, N from a bitstream for the video data.

5. The method of claim 1, further comprising:
   decoding, by the one or more processors, the binarization value from a bitstream for the video data.

6. The method of claim 1, further comprising:
   determining, by the one or more processors, the second weighting factor using a band of a plurality of bands, each band of the plurality of bands including a plurality of weight factors.

7. The method of claim 1, wherein generating the prediction information comprises calculating:

$$P_{GBi}((1-w_1)*P_{L0}+w_1*P_{L1}+\text{RoundingOffset}_{GBi})\text{>>shiftNum}_{GBi},$$

wherein $P_{GBi}$ is the prediction information, $P_{L0}$ is a first predictor for the first reference picture, $P_{L1}$ is a second predictor for the second reference picture, RoundingOffset is a predefined offset, shiftNum is a predefined number of left shift operations, $w_1$ is the second weighting factor, and $(1-w_1)$ is the first weighting factor.

8. The method of claim 1,
   wherein the first picture list is list 0 (L0) and the second picture list is list 1 (L1), or
   wherein the first picture list is list 1 (L1) and the second picture list is list 0 (L0).

9. The method of claim 1, comprising:
   decoding, by the one or more processors, a residual block for the current block; and
   decoding, by the one or more processors, the current block using the prediction information and the residual block.

10. A device for processing video data, the device comprising:
    a memory configured to store video data; and
    one or more processors implemented in circuitry and configured to:
      select a first reference picture in a first picture list;
      determine a binarization value from a plurality of binarization values, the binarization value being assigned both a reference index configured to specify whether a second reference picture is in the first picture list or a second picture list and a second weighting factor for the second reference picture;
      determine, based on the binarization value, both the reference index assigned to the binarization value and the second weighting factor assigned to the binarization value;
      select the second reference picture from a plurality of reference pictures of the second picture list using the reference index assigned to the binarization value;
      generate a first weighting factor for the first reference picture in the first picture list using the second weighting factor assigned to the binarization value; and
      generate prediction information for a current block of the video data using the first weighting factor and the second weighting factor.

11. The device of claim 10, wherein, to generate the first weighting factor, the one or more processors are configured to:
    calculate N minus the second weighting factor, wherein N is an integer.

12. The device of claim 11, wherein N is 1.

13. The device of claim 11, wherein the one or more processors are configured to:
    decode N from a bitstream for the video data.

14. The device of claim 10, wherein the one or more processors are configured to:
    decode the binarization value from a bitstream for the video data.

15. The device of claim 10, wherein the one or more processors are configured to:
    determine the second weighting factor using a band of a plurality of bands, each band of the plurality of bands including a plurality of weight factors.

16. The device of claim 10, wherein, to generate the prediction information, the one or more processors are configured to calculate:

$$P_{GBi}((1-w_1)*P_{L0}+w_1*P_{L1}+\text{RoundingOffset}_{GBi})\!>\!>\!\text{shiftNum}_{GBi},$$

wherein $P_{GBi}$ is the prediction information, $P_{L0}$ is a first predictor for the first reference picture, $P_{L1}$ is a second predictor for the second reference picture, RoundingOffset is a predefined offset, shiftNum is a predefined number of left shift operations, $w_1$ is the second weighting factor, and $(1-w_1)$ is the first weighting factor.

17. The device of claim 10,
wherein the first picture list is list 0 (L0) and the second picture list is list 1 (L1); or
wherein the first picture list is list 1 (L1) and the second picture list is list 0 (L0).

18. The device of claim 10, wherein the one or more processors are configured to:
decode a residual block for the current block; and
decode the current block using the prediction information and the residual block.

19. The device of claim 10, wherein the device comprises one or more of a camera, a computer, a mobile device, a broadcast receiver device, or a set-top box.

20. A non-transitory computer-readable storage medium having stored thereon instructions that, when executed, cause a processor to:
select a first reference picture in a first picture list;
determine a binarization value from a plurality of binarization values, the binarization value being assigned both a reference index configured to specify whether a second reference picture is in the first picture list or a second picture list and a second weighting factor for the second reference picture;
determine, based on the binarization value, both the reference index assigned to the binarization value and the second weighting factor assigned to the binarization value;
select the second reference picture from a plurality of reference pictures of the second picture list using the reference index assigned to the binarization value;
generate a first weighting factor for the first reference picture in the first picture list using the second weighting factor assigned to the binarization value; and
generate prediction information for a current block of the video data using the first weighting factor and the second weighting factor.

21. A device for coding video data, the device comprising:
means for selecting a first reference picture in a first picture list;
means for determining a binarization value from a plurality of binarization values, the binarization value being assigned both a reference index configured to specify whether a second reference picture is in the first picture list or a second picture list and a second weighting factor for the second reference picture;
means for determining, based on the binarization value, both the reference index assigned to the binarization value and the second weighting factor assigned to the binarization value;
means for selecting the second reference picture from a plurality of reference pictures of the second picture list using the reference index assigned to the binarization value;
means for generating a first weighting factor for the first reference picture in the first picture list using the second weighting factor assigned to the binarization value; and
means for generating prediction information for a current block of the video data using the first weighting factor and the second weighting factor.

* * * * *